United States Patent [19]
Murayama et al.

[11] Patent Number: 5,926,352
[45] Date of Patent: Jul. 20, 1999

[54] MAGNETIC DISK AND A GLASS SUBSTRATE FOR THE MAGNETIC DISK

[75] Inventors: Yuzo Murayama; Naohiko Ishimaru, both of Yonezawa, Japan

[73] Assignee: AG Technology Co., Ltd., Yokohama, Japan

[21] Appl. No.: 08/155,771

[22] Filed: Nov. 23, 1993

[51] Int. Cl.⁶ .................................................. G11B 5/82
[52] U.S. Cl. ............................................................ 360/135
[58] Field of Search ............................................ 360/135

[56] References Cited

FOREIGN PATENT DOCUMENTS 4-353619  8/1992  Japan .
5-89459   9/1993  Japan .

*Primary Examiner*—Robert S. Tupper
*Attorney, Agent, or Firm*—Oblon, Spivak, McClelland, Maier & Neustadt, P.C.

[57] ABSTRACT

A magnetic disk comprises a glass substrate and a magnetic layer formed on the glass substrate wherein the maximum deflection of a bent portion in the radial direction of the magnetic disk with respect to a reference length of 2 mm is 1,500 Å or less in the entire region of a surface of the disk excluding annular areas having a width of 250 μm which are respectively formed inwardly from annular lines at which chamfered portions formed at the inner and outer peripheries of the magnetic disk and the disk surface intersect.

4 Claims, 1 Drawing Sheet

5,926,352

MAGNETIC DISK AND A GLASS SUBSTRATE FOR THE MAGNETIC DISK

BACKGROUND OF THE INVENTION

1. Field of the Invention

The present invention relates to a magnetic disk and a glass substrate for the magnetic disk.

2. Discussion of Background

Glass has been noticed as substrate for a magnetic disk suitable for high density recording since it is excellent in surface smoothness, hard, has a large deformation resistance and has little surface defect. On the other hand, there has been requirement to expand the recording area of the magnetic disk so as to increase storage capacity, and especially, to expand the recording area to the outer peripheral portion. The requirement is commonly applied not only to a glass substrate but also a conventional aluminum substrate.

The glass substrate for a magnetic disk is polished. In the conventional polishing method, the glass substrate has been treated, especially by fine polishing with a relatively soft suede type foamed polyurethane in order to minimize flaws on the surface and to control surface roughness. When the polishing was conducted, a polishing pad was deformed at the outer peripheral portion of the glass substrate, whereby the outer peripheral portion could not maintain a flat surface. In other words, the outer peripheral portion can not maintain a level surface which is extension from the inner peripheral portion or the central portion in the surface of the glass substrate, and a downwardly bent portion or an upwardly bent portion, which is called Roll-off, was caused in the surface of the glass substrate. When a glass substrate having a downwardly bent portion or an upwardly bent portion is formed, a magnetic disk with a magnetic layer also has such an undesirable shape corresponding to the glass plate. When such magnetic disk was used and a magnetic head was caused to fly above the magnetic disk, the magnetic head inclined at a downwardly bent portion or an upwardly bent portion, particularly at the outermost peripheral portion, and accordingly, a stable flying movement could not be obtained. In particular, when the degree of deflection was large, the magnetic head became in contact with or collided with the magnetic disk, and accordingly, it was impossible to use the outer or inner peripheral portions as the recording area.

SUMMARY OF THE INVENTION

It is an object of the present invention to provide a magnetic disk and a glass substrate for the magnetic disk wherein a problem of causing a downwardly bent portion or an upwardly bent portion in the magnetic disk or the glass substrate for the magnetic disk which results in an unstable flying movement of a magnetic head can be eliminated.

In accordance with the present invention, there is provided a magnetic disk comprising a glass substrate and a magnetic layer formed on the glass substrate wherein the maximum deflection of a bent portion in the radial direction of the magnetic disk with respect to a reference length of 2 mm is 1,500 Å or less in the entire region of a surface of the disk excluding annular areas having a width of 250 μm which are respectively formed inwardly from annular lines at which chamfered portions formed at the inner and outer peripheries of the magnetic disk and the disk surface intersect.

In accordance with the present invention, there is provided the above-mentioned magnetic disk wherein the maximum deflection of the bent portion with respect to a reference length of 4 mm is 1,500 Å or less.

In accordance with the present invention, there is provided magnetic disk as described above wherein a deviation value in flying height of a magnetic head for recording and reading is less than 1 microinch in the entire region of the disk surface excluding annular areas having a width of 250 μm which are respectively formed inwardly from annular lines at which chamfered portions formed at the inner and outer peripheries of the magnetic disk and the disk surface intersect.

In accordance with the present invention, there is provided a magnetic disk wherein the maximum deflection of a bent portion in the radial direction of a glass substrate for a magnetic disk with respect to a reference length of 2 mm is 1,500 Å or less in the entire region of the surface of the glass substrate excluding annular areas having a width of 250 μm which are respectively formed inwardly from annular lines at which chamfered portions formed at the inner and outer peripheries of the glass substrate and the glass substrate surface intersect.

In accordance with the present invention, there is provided a magnetic disk wherein the maximum deflection of a bent portion in the radial direction of a glass substrate for a magnetic disk with respect to a reference length of 4 mm is 1,500 Å or less in the entire region of the surface of the glass substrate excluding annular areas having a width of 250 μm which are respectively formed inwardly from annular lines at which chamfered portions formed at the inner and outer peripheries of the glass substrate and the glass substrate surface intersect.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

A magnetic disk and a glass substrate for the magnetic disk will be described in more detail with reference to the drawings.

Figure 1:
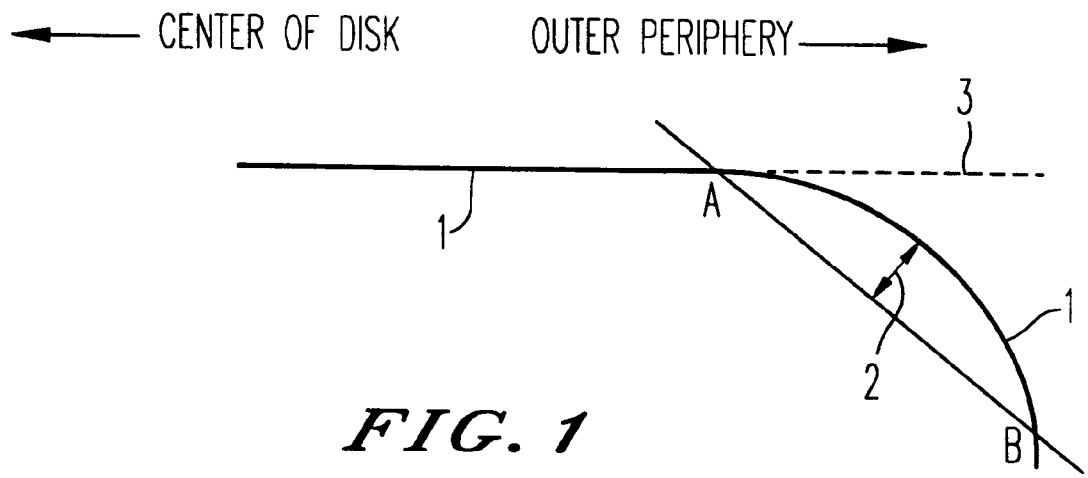
FIG. 1 is a diagram showing a bent portion resulted at an outer peripheral portion of a magnetic disk or a glass substrate for the magnetic disk.

FIG. 1 is a diagram showing a part of a magnetic disk in cross section wherein the part is taken along a plane including the diameter of the magnetic disk and perpendicular to the main flat plane of the disk. A curved line 1 designates a portion of the glass substrate which is downwardly bent in the direction of the diameter of the main flat plane of the substrate. A bent portion of the substrate is resulted from the deformation of a polishing pad. If there is no bent portion and the magnetic disk is flat along the direction of the main flat plane, the outer peripheral portion of the disk will be shown by a linear line 3. The shape in cross section of the glass substrate is also shown by the same diagram as the magnetic disk.

Figure 2:
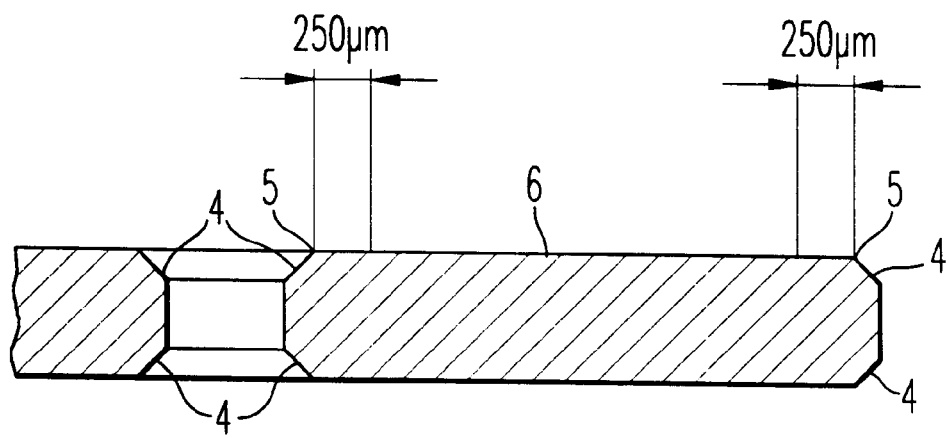
FIG. 2 is a cross-sectional view of a magnetic disk or a glass substrate for the magnetic disk, which is taken along a plane including the diameter of the magnetic disk or the glass substrate and perpendicular to the main plane of it.

FIG. 2 is a cross-sectional view of the magnetic disk, which is taken along a plane including the diameter of the disk and perpendicular to the main flat plane of it wherein the thickness of the disk is drawn with a great exaggeration.

The magnetic disk has chamfered portions 4 at the inner and outer peripheries in the radial direction of it. An area in the surface of the magnetic disk excluding annular areas having a width of 250 μm which are respectively formed at the inner portions from annular lines 5 at which the chamfered portions 4 of the inner and outer peripheries of the magnetic disk is called a reference length selecting area 6. As shown in FIG. 1, in the magnetic disk having a bent portion which has resulted from a polishing treatment, the curved line 1 in the bent portion is sectioned by a linear line passing through two points A and B. The linear line AB and the curved line AB (a part of the curved line 1) are compared. In this description, the linear line AB is called a reference length, and the greatest value of the deflection of the curved line AB which is extended perpendicular to the linear line AB is called the maximum deflection 2. If the reference length is changed, the maximum deflection is also changed. In this description, a bent portion of the magnetic disk is defined in terms of the reference length and the maximum deflection.

In the bent portion in the radial direction of the magnetic disk or the glass substrate for the magnetic disk, the maximum deflection with respect to a reference length of 2 mm is 1,500 Å or less. In particular, the maximum deflection with respect to a reference length of 4 mm is 1,500 Å or less. The magnitude of the bent portion can be measured by using a needle contact type surface meter or a laser interference type surface meter.

The reference length can be selected in the entire region of the magnetic disk or the glass surface excluding the annular areas having a width of 250 μm which are respectively formed at the inner portions between annular lines at which the chamfered portions formed at the inner and outer peripheries of the magnetic disk and the surface of the magnetic disk intersect.

Further, a feature of the present invention is that a deviation value in flying height of a magnetic head for performing recording and reading is within 1 microinch in the beforementioned region of the magnetic disk wherein a magnetic layer is formed on the glass substrate. When the maximum deflection is smaller with respect to a reference length, the magnetic head can stably fly.

For the glass substrate, soda lime silicate glass, non-alkaline glass, borosilicate glass, quartz glass, physically strengthened glass, crystal glass or the like may be used.

An undercoat layer may be used between the glass substrate and the magnetic layer if required. Further, a protecting layer and a lubricant layer are usually formed on the magnetic layer.

As a polishing machine for processing the glass substrate without any bent portion, a batch type or a continuous type machine can be used. After the glass substrate is set in a carrier, the carrier with the glass plate is interposed between upper and lower platens on which polishing pads are mounted, and the glass substrate is polished by applying a pressure.

In polishing the glass substrate with use of the polishing pad of foamed polyurethane, it is effective to conduct two-step polishing treatments to remove fine flaws and latent flaws in the surface of the glass substrate, namely, a polishing pad of a relatively hard type foamed polyurethane is used as the primary polishing, and a polishing pad of a relatively soft suede type foamed polyurethane is used as the secondary polishing.

For the polishing pad used for the secondary polishing, it is important that the pad itself is not deformed in the polishing operation. As such polishing pad for suppressing the deformation of the glass substrate, a polishing pad having a thickness of 3 mm or less, preferably 1 mm or less and having the properties of a compressibility of 30% or less, preferably 20% or less and a compression modulus of elasticity of 80% or more (JIS L1021, applied load: 1.2 kg/cm$^2$) can be used.

Abrasive grain to be used can be selected from the group consisting of $CeO_2$, $Fe_2O_3$, $ZrO_2$ and $Al_2O_3$. The abrasive grain and the grain size can be selected in consideration of a finishing state of the surface of the glass substrate.

EXAMPLE

As glass substrates for magnetic disks, soda lime glass disks having an outer diameter of 95 mm and a thickness of 0.8 mm were prepared, and the primary polishing described before was conducted to the soda lime glass disks. Then, the secondary polishing was conducted with use of a polishing pad having a thickness of 0.8 mm under various conditions as described in Table 1. A state of deflection in the respective glass disks was examined. Then, a Co-Pt series magnetic layer and a carbon protective layer were formed on the respective glass substrates to thereby form magnetic disks. A state of deflection in the magnetic disks and magnetic head flying characteristics were examined.

Attention was paid to the outer peripheral portion where a bent portion has resulted conspicuously in the glass substrates and the magnetic disks. Table 1 shows the values of maximum deflection in the glass substrates and the magnetic disks prepared by using the glass substrate which are obtained by the secondary polishing under seven different conditions and the minimum gap values between the magnetic head and the magnetic disk corresponding to a flying height of magnetic head of 7 microinch, 4 microinch and 2 microinch, respectively. The maximum deflection of the glass substrates and the magnetic disks prepared by using the glass substrates are substantially equal.

The measurement of the maximum deflection was conducted by selecting a reference length of 2 mm and a reference length of 4 mm in the radial direction from the outer peripheral portion of the substrates in the above-mentioned reference length selecting region. The minimum gap values between the magnetic head and the magnetic disks were measured by causing the magnetic head to fly with an initial flying height of 7.0 microinch, 4.0 microinch and 2.0 microinch respectively in the radial direction from the outer periphery. In the magnetic disks having a conspicuous bent portion at the outer periphery, the flying posture of the magnetic head loses stability and inclines, and the minimum gap value is reduced.

A deviation value in the flying height of the magnetic head is expressed by an error between the initial flying height of the magnetic head and the minimum gap in Table 1. As the error is smaller, the magnetic head can fly stably. When the maximum deflection is small, the magnetic head can fly stably. The minimum gap values in Table 1 are obtained when the position of the magnetic head in the outermost peripheral portion coincide with the outermost peripheral portion of the reference length determined on the glass substrate.

In Table 1, Nos. 1–3 designate the magnetic disks of the present invention, which show extremely small deviation value of the minimum gap, i.e. less than 1 microinch, and a stable flying movement. On the other hand, Nos. 4–7 designate the magnetic disks having a larger maximum deflection values than that of the present invention, namely, the deviation value of the minimum gap are large and the flying movement is unstable. In particular, head crash is resulted in the magnetic disks Nos. 6 and 7 having a large deflection values in the flying operation of 4.0 microinch. Further, head crash is resulted in the magnetic disks Nos. 4–7 having a larger maximum deflection values in a flying operation of 2.0 microinch.

In accordance with the magnetic disk of the present invention, a bent portion in the surface of the disk is extremely small, a magnetic head can fly at a lower flying height in the entire region from the inner periphery to the outermost periphery of the disk, and high density recording is possible.

TABLE 1

| Magnetic disk number | | | 1 | 2 | 3 | 4 | 5 | 6 | 7 |
|---|---|---|---|---|---|---|---|---|---|
| Secondary polishing pad | Compressibility (%) | | 16 | 18 | 22 | 28 | 32 | 35 | 38 |
| | Compression modulus of elasticity (%) | | 87 | 92 | 92 | 77 | 85 | 80 | 78 |
| Deflection (Å) Reference length: 2 mm | | | 121 | 727 | 1116 | 2061 | 2424 | 3394 | 4727 |
| Deflection (Å) Reference length: 4 mm | | | 333 | 1000 | 1402 | 2467 | 2867 | 3933 | 5400 |
| Minimum gap quantity * | | 7.0 | 6.8 | 6.3 | 6.1 | 5.2 | 4.9 | 4.1 | 3.0 |
| [Deviation value in flying height] (microinch) | Initial flying height | | [0.2] | [0.7] | [0.9] | [1.8] | [2.1] | [2.9] | [4.0] |
| | | 4.0 | 3.8 | 3.3 | 3.1 | 2.0 | 1.6 | x | x |
| | | | [0.2] | [0.7] | [0.9] | [2.0] | [2.4] | ** | ** |
| | | 2.0 | 1.8 | 1.4 | 1.1 | x | x | x | x |
| | | | [0.2] | [0.6] | [0.9] | ** | ** | ** | ** |

*Unit: microinch
**Crash

Obviously, numerous modifications and variations of the present invention are possible in light of the above teachings. It is therefore to be understood that within the scope of the appended claims, the invention may be practiced otherwise than as specifically described herein.

What is claimed:

1. A magnetic disk comprising a glass substrate and a magnetic layer formed on the glass substrate wherein the maximum deflection of any bent portion in the radial direction of the magnetic disk with respect to a reference length of 2 mm is not more than 1,500 Å in the entire region of the surface of the disk excluding annular areas having a width of 250 μm which are respectively defined inwardly from annular lines at which chamfered portions formed at the inner and outer peripheries of the magnetic disk and the disk surface intersect.

2. The magnetic disk according to claim 1, wherein the maximum deflection of the bent portion with respect to a reference length of 4 mm is not more then 1,500 Å in said entire region of the surface of the disk.

3. The magnetic disk according to claim 1, wherein the maximum deflection of any bent portion in the radial direction of a glass substrate for a magnetic disk with respect to a reference length of 2 mm is at most 1,500 Å in the entire region of the surface of the glass substrate excluding annular areas having a width of 250 μm which are respectively defined inwardly from annular lines at which chamfered portions formed at the inner and outer peripheries of the glass substrate and the glass substrate surface intersect.

4. The magnetic disk according to claim 1, wherein the maximum deflection of any bent portion in the radial direction of a glass substrate for a magnetic disk with respect to a reference length of 4 mm is at most 1,500 Å in the entire region of the surface of the glass substrate excluding annular areas having a width of 250 μm which are respectively defined inwardly from annular lines at which chamfered portions formed at the inner and outer peripheries of the glass substrate and the glass substrate surface intersect.

* * * * *